INVENTOR.
MEYER SAKLAD
JOHN F. ROCKETT, JR.
BY
Their ATTORNEY

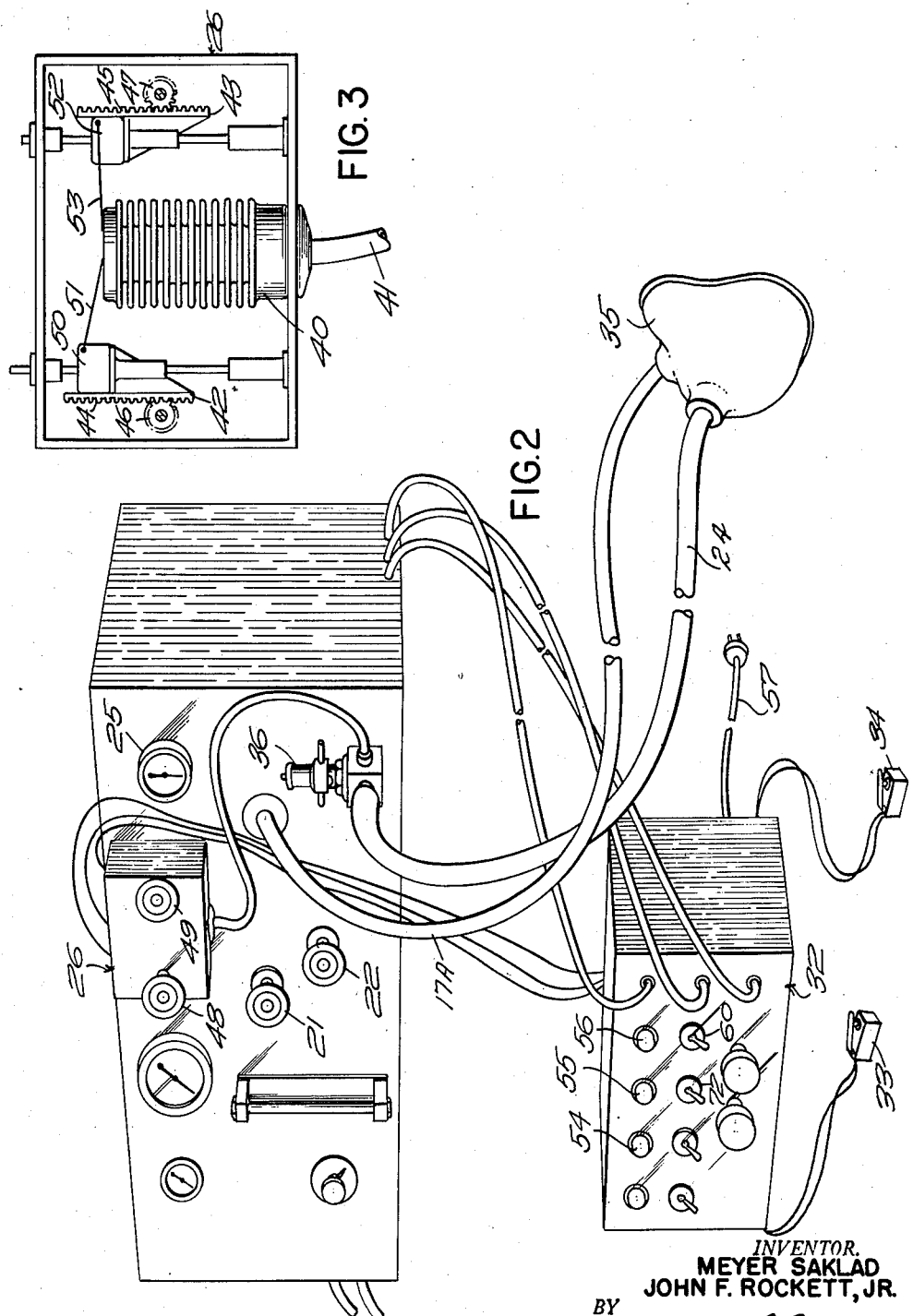

April 15, 1958   M. SAKLAD ET AL   2,830,580
ELECTRONICALLY CONTROLLED RESPIRATORY APPARATUS
Filed Oct. 21, 1952   6 Sheets-Sheet 3

INVENTOR.
MEYER SAKLAD
JOHN F. ROCKETT, JR.
BY
Their ATTORNEY

INVENTOR.
MEYER SAKLAD
JOHN F. ROCKETT, JR.
BY
Their ATTORNEY

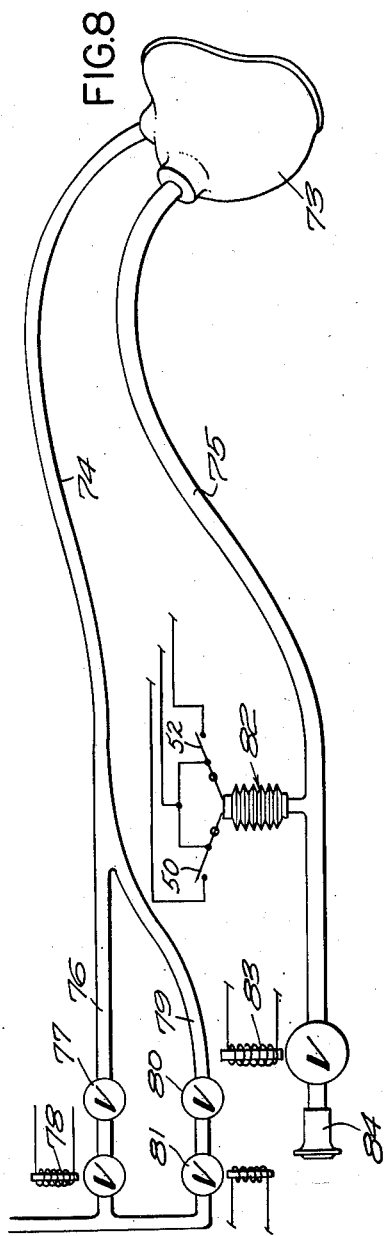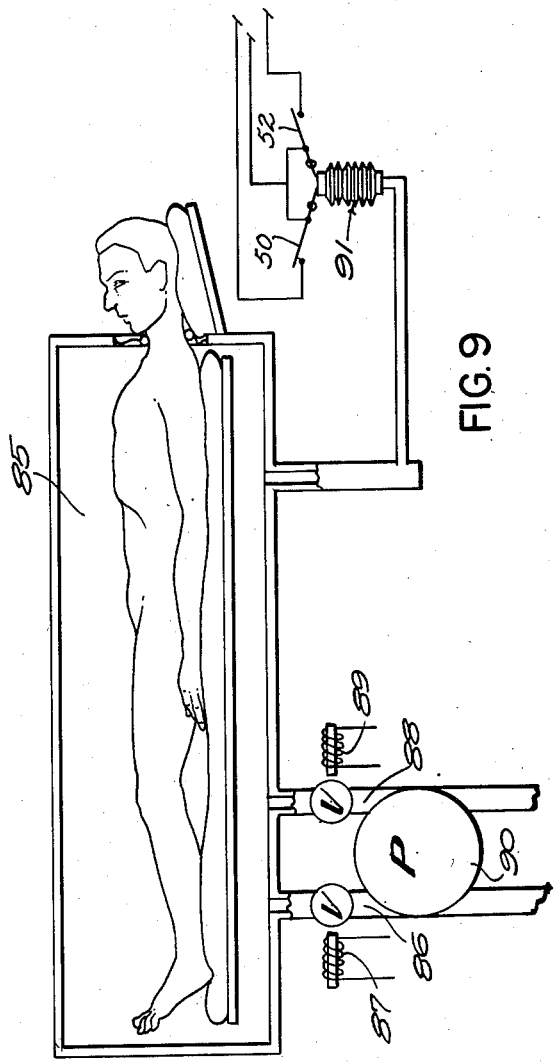

April 15, 1958 — M. SAKLAD ET AL — 2,830,580
ELECTRONICALLY CONTROLLED RESPIRATORY APPARATUS
Filed Oct. 21, 1952 — 6 Sheets-Sheet 6

INVENTOR.
MEYER SAKLAD
JOHN F. ROCKETT, JR.
BY
Their ATTORNEY

United States Patent Office 2,830,580
Patented Apr. 15, 1958

2,830,580

ELECTRONICALLY CONTROLLED RESPIRATORY APPARATUS

Meyer Saklad, Providence, R. I., and John F. Rockett, Jr., Medford, Mass.

Application October 21, 1952, Serial No. 319,634

7 Claims. (Cl. 128—29)

The present invention relates to a respiratory apparatus, and more particularly to an electronically controlled device for providing either controlled or assisted respiration.

The principal object of the present invention is to provide an electronically controlled device for producing controlled respiration in cases where an individual has ceased breathing and/or for producing assisted respiration where an individual is either not breathing adequately through his own efforts or who needs a greater volume of oxygen to satisfy his requirements.

In accomplishing the above the present invention provides an electronic device sensitive to the patient's demands and thus automatically conforms to the patient's efforts and aids or assists in breathing. The apparatus also senses the absence of respiratory efforts and under this circumstance breathes for or establishes controlled respiration.

The apparatus because of an incorporated electronic timer and because of the sensing device controls volume flow of oxygen and compressed gases. Such volume flow can be controlled so as to build up a degree of positive pressure, negative pressure or each in sequence.

The above described characteristics lend themselves to utilization in many forms of respiratory equipment, viz., anesthesia apparatus, resuscitator apparatus and apparatus for high altitude respiration.

The present invention provides an electronically controlled respiratory apparatus which accurately and automatically controls the proportion of gases, the humidity, the volume, the rate of flow, the positive and negative pressure and the time sequence of delivery.

With the above and other objects and advantageous features in view, our invention consists of a novel arrangement of parts, more fully disclosed in the detailed description following, in conjunction with the accompanying drawings, and more particularly defined in the appended claims.

In the drawings:

Fig. 2 is a perspective view of the apparatus, hooked up as shown in Fig. 1.

Fig. 3 is a side elevation of the pressure-sensing mechanism.

Fig. 8 is a plan view, partially diagrammatic showing the device used as a resuscitator.

Fig. 9 is a diagrammatic view of the device used as an "iron lung."

It has been found desirable to provide an accurately controlled apparatus which, in whole or in part, can breathe for an individual who can no longer breathe on his own and which can aid in breathing where the individual's own efforts to breathe are inadequate. For example, during certain operations the patient is deliberately prevented from breathing on his own by anesthesia (by overdose, washing out of carbon dioxide, use of curare and curare-like agents). Similarly, the patient may cease breathing as a result of an accident such as an overdose of anesthesia, poisoning, drowning, or for any other cause. In the above cases, it is desirable that the apparatus take over and satisfactorily breathe for the individual. While breathing for the patient it is possible through alteration of the controls to vary duration of inspiration and expiration, the height of intrapulmonary pressure and the degree of negative pressure. The height of increased intrapulmonary pressure may be limited by the volume flow or may be preset by the sensing device, so that the gas flow ceases when a desired pressure is reached.

The apparatus of the present invention is also sensitive to the demands of the patient and operates as an assister or aid to breathing when the patient's own efforts are inadequate during surgery or any other reason. The present apparatus is also adaptable for use by pilots at high altitudes who require high oxygen concentrates and some degree of pressure breathing. This more particularly set forth in our copending application Ser. No. 315,976 entitled High Altitude Respiratory Apparatus filed October 21, 1952.

Figure 1:
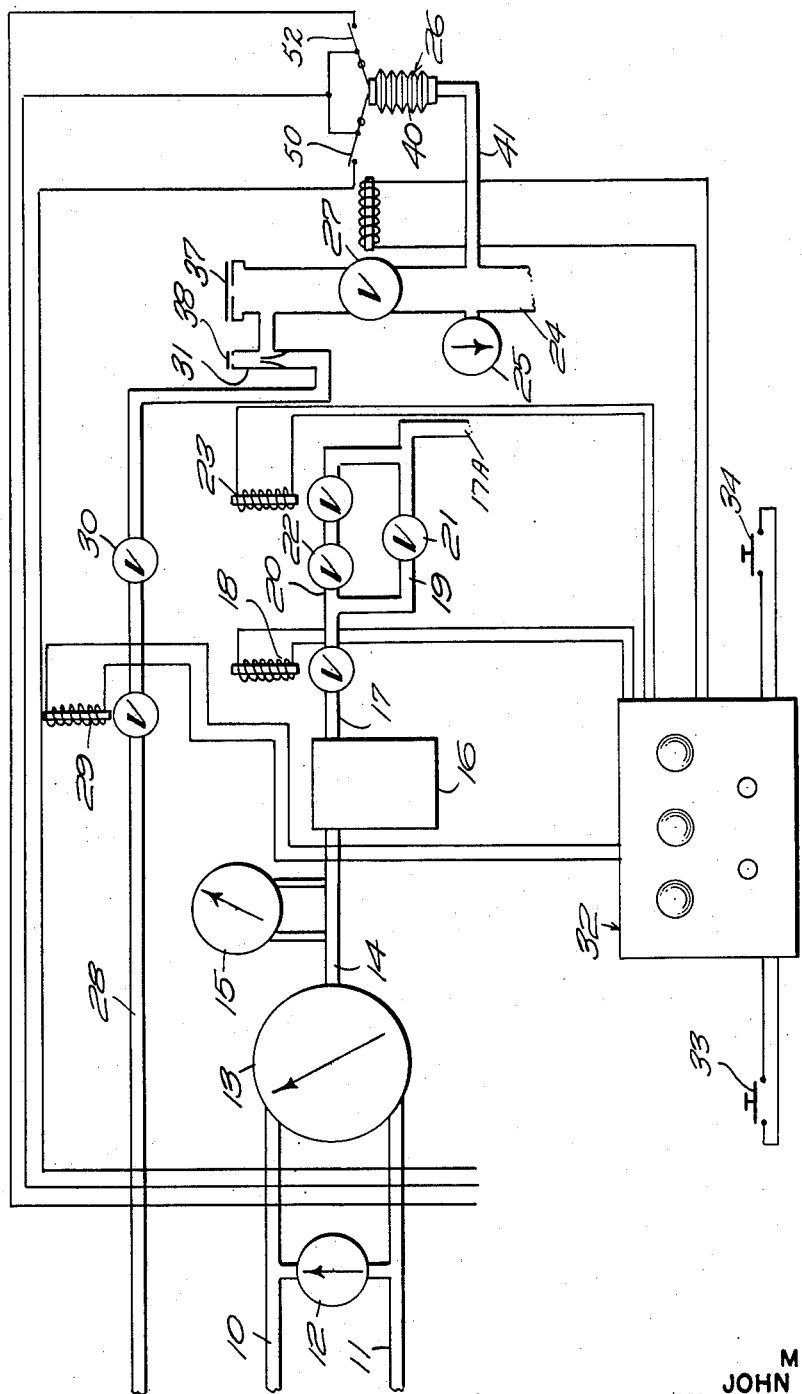
Fig. 1 is a diagrammatic view of an apparatus embodying our invention.
Figure 4:
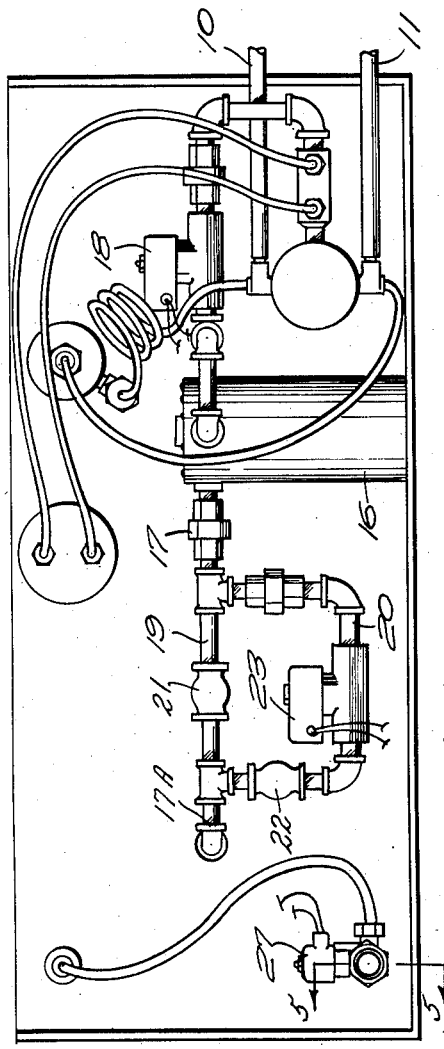
Fig. 4 is a rear view of the apparatus shown in Fig. 2.

Referring now to the drawings and more particularly to Figure 1, we have shown therein in schematic form the arrangement of anesthesia apparatus of our invention. The anesthetizing gases such as nitrous oxide and oxygen are connected to the ducts 10 and 11. The equalizing valve 12 adjusts the pressure between these two gases, which may be proportioned in the proper amounts in the proportioning control 13. There is a duct 14 at the output of this proportioning control through which the gases flow to a humidifier 16, the flow being measured by a suitable flow meter 15. This portion of the apparatus is of conventional design found in many anesthetizing apparatuses. The properly proportioned and humidified gases leave the humidifier through a pipe 17 which has in circuit therewith a solenoid valve 18 that is controlled by circuitry which will be described later. At the output of this valve 18 there are two branches 19 and 20 that are in parallel with each other and rejoin at the duct 17A. In branch 20 the flow therethrough is regulated by a hand-operated valve 22 that is in series with a solenoid valve 23, while the flow in branch 19 is controlled by a hand-operated valve 21. It will be understood that the duct 17A leads to the face mask or other device, as shown more particularly in Figure 2. The return from this face mask 35 or other device is by a duct 24. This duct has a branch 41 which is connected to a pressure-sensing device 26, shown more particularly in Figure 3, and which is designed to operate two switches 50 and 52, switch 50 being responsive to a positive pressure above that set by the device, and switch 52 being responsive and closed upon a negative pressure sensed by the device.

While any type of pressure-sensing mechanism 26 may be used, we have illustrated a bellows type device, shown in detail in Figure 3. In this device conventional bellows 40 is connected to the exhaust line 24 through a pipe 41, the bellows moving vertically with the pressure positive or negative. Vertically slidably mounted on each side of the bellows 40 are a pair of plates 42 and 43 having rack teeth 44 and 45 along their side edges. Gears 46 and 47 operate knobs 48 and 49 and adjust the vertical position of the plates 42 and 43. Mounted on plate 42 is a micro-switch 50 having an arm 51 resting on the top of the bellows 40. Mounted on the plate 43 is a second micro-switch 52 having an arm 53 also resting on the tip of the bellows 40. The micro-switches are so arranged that the switch 52 is sensitive to the negative pressure and is operable on the downward movement of the bellows 40, while the switch 50 is sensitive to the positive pressure and is operable on the upward movement of the bellows 40.

Figure 5:
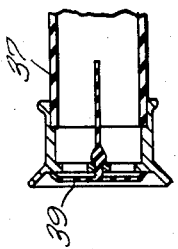
Fig. 5 is a section of the Acushnet valve.

Duct 24 is open to the atmosphere at the far end thereof through an "Acushnet" valve 37 which is in effect a one-way valve that is provided with a closing diaphragm 39 (see Figure 5). There is additionally provided an exhaust control valve in the duct 24 which may take the form of a solenoid valve 27. Connected near the outlet end of the duct 24 is a Venturi assembly 31 which has its input connected to a source of air under pressure via duct 28. For control purposes there is interspersed in duct 28 ahead of the Venturi assembly a solenoid control valve 29 and a hand flow control valve 30. The throat of the Venturi is connected to the duct 24 and the output thereof opens to the atmosphere through a second "Acushnet" valve 38. It will therefore be apparent that by the provision of this Venturi section, a controllable amount of negative pressure may be developed at the throat thereof and transmitted to the exhaust duct 24, which will in effect create a partial vacuum therein. All of the solenoid valves and the switches of the pressure-sensing device 26 are electrically connected to an electronic control device 32 which will now be described.

Figure 7:
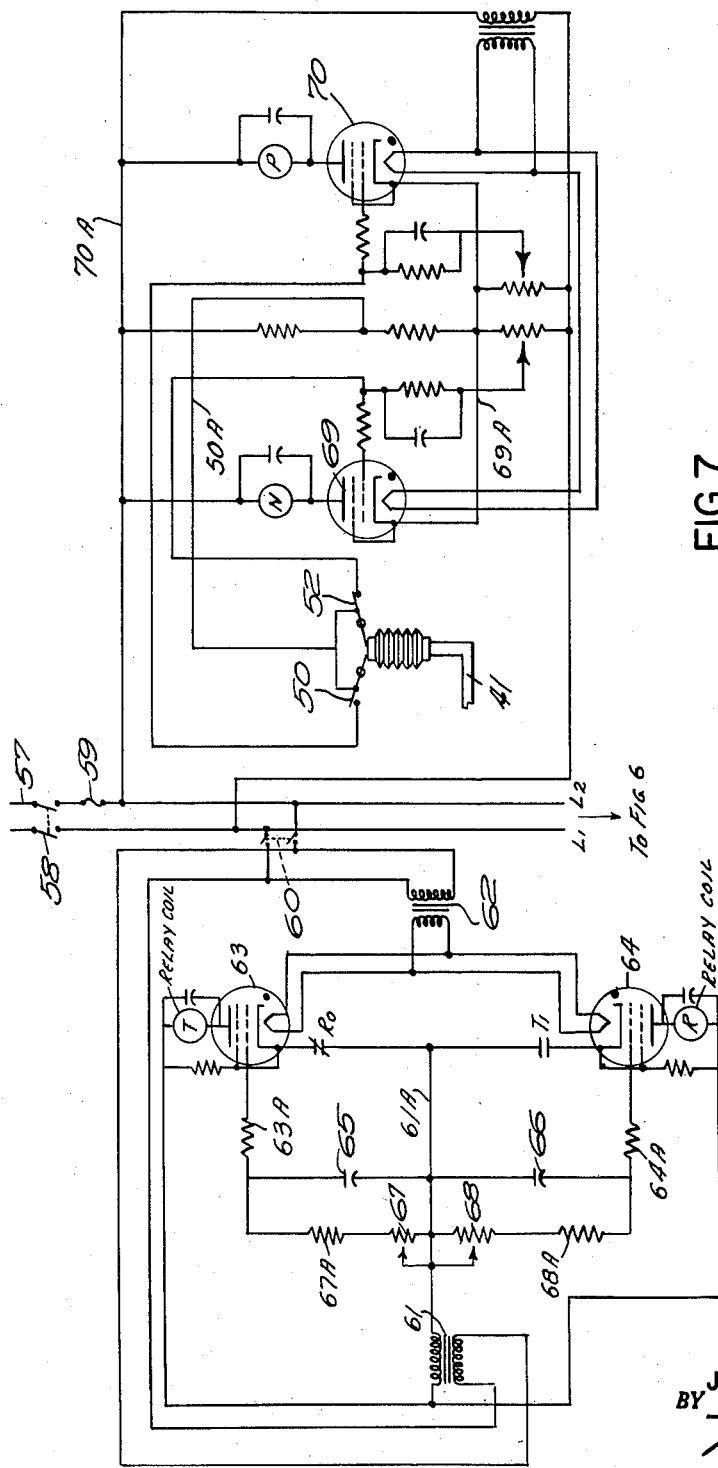
Fig. 7 is a diagram of the time and pressure control hook-up.

Referring particularly to Figure 7, which shows a schematic diagram of the electronic control unit 32, there is a source of alternating current 57 provided which is controlled by a switch 58 and fused at 59. The timing control section of the diagram appears to the left of the power line 57 and is energized by a switch 60 which is connected to the primary of transformers 61 and 62. Transformer 62 is a filament transformer, while transformer 61 is a plate voltage supply transformer for the two thyratron control tubes 63 and 64. The secondary of the plate supply transformer 61 has one side thereof connected to a common reference potential bus 61A, while the other end thereof is connected to the plates of the thyratron control tubes 63 and 64 through relay coils of relays T and R. Between the potential bus 61A and the grids of the respective tubes 63 and 64 there are connected phase control networks. The network for tube 63 consists of a capacitance 65 in parallel with a fixed resistance 67A and a variable resistance 67 which are in series with a current-limiting resistor 63A. The phase-shifting network for tube 64 is identical and consists of a parallel network made up of capacitance 66 in parallel with fixed resistance 68A and a variable resistance 68, which are in turn in series with a current-limiting resistor 64A. Between the cathode of tube 63 and the reference bus 61A is a contact of relay R, while between the cathode of tube 64 and the reference bus 61A is a contact of relay T. As is well known in the art, the firing of the tubes 63 an 64 is controlled by the voltage on the grids of the respective tubes. In order for firing to occur, the plate voltage must be positive with respect to the cathode, and the applied grid voltage must exceed the critical grid voltage, which will cause ionization of the tubes. The phase-shifting networks that are provided in the grid circuit of these two tubes control the phase of the applied grid voltage with respect to the applied plate voltage and by suitable adjustment such as variable resistances 67, 68, the time constants of the R-C circuit will be changed which will vary the period of firing. Disregarding the relays R and T, therefore, it will be apparent that the firing of the tubes 63 and 64 will occur whenever the anode voltage is positive with respect to the cathode and the grid voltage is above the critical grid voltage for the tube in question, the phasing of the firing from the moment the plate voltage has a positive excursion being controlled by the phase-control networks. From a basic standpoint, therefore, the tubes when energized by a source of voltage as disclosed will fire alternately and by a mere adjustment of resistances 67, 68 the period of this repetitive firing may be varied. The effect of this phenomena for the purposes of this disclosure is to control the timing of contact T as will become readily apparent.

Referring to the portion of Figure 7 to the right of the power line 57, there is shown a control circuit that is under the actuation of the switches 50 and 52 of the pressure sensitive device 26. Two thyratron switch tubes 69 and 70 are provided which have in their plate circuit the coils of relays N and P, respectively. The grid of switch tube 69 is connected to switch 52, while the grid of switch tube 70 is connected to switch 50. It will be noted that a voltage divider is provided between the reference potential bus 69A and the plate supply bus 70A which is tapped and connected by a wire 50A to one side of switches 50 and 52. It will be apparent, therefore, that upon closing the switches 50 and 52, the grids of switch tubes 69 and 70 are made positive with respect to their cathodes and are connected to the reference potential bus 69A and that firing will occur, thereby energizing the relays in their plate circuits. In effect, therefore, the tubes 69 and 70 are nothing more than devices which will operate relays N and P with little or no contact arcing taking place at switches 50 and 52, which effect is desirable in an anesthesia apparatus that is operating in a highly explosive atmosphere. The operation of these electronic circuits just described and their interrelation with the valves will now be described.

Let us assume that the patient takes a breath. When so doing, a negative pressure will be created in the duct 24 which will be sensed by the pressure device 26. Switch 52 will close, which will fire tube 69, thereby operating the armature of relay N. The operation of relay N will close contact $N_1$, which in turn will energize the armature of relay $R_2$ as well as the armature of supply valve 23, thereby opening it. Relay $R_2$ has a locking contact $R_{22}$ which will hold the relay in by virtue of the fact that contact $P_1$ is closed. It should also be noted at this instant that vave 27 is cosed, since contact $R_{12}$ is open, and additionally that relay $R_1$ is energized by virtue of the fact that contact $P_2$ is closed.

When the patient exhales, a positive pressure is created, which will be sensed in the device 26, thereby closing switch 50, switch 52 opening. At this condition tube 70 will fire, energizing the armature of relay P. This will open contact $P_2$, deenergizing relay $R_1$, which in turn will close contact $R_{12}$ and open the exhaust valve 27. Additionally, contact $R_{13}$ will open, thereby closing valve 18. Also upon the energizing of relay P, contact $P_1$ will be opened that will release relay $R_2$ and close valve 23. Also when relay P is energized, contact $P_{TD}$ is open.

Now if a positive pressure is not received in the duct 24, switch 50 will open that will in turn close contact $P_2$ and the automatic timer represented by contacts T will be in circuit and take over the breathing for the patient. If per chance a negative pressure is desired, switch 71 may be closed, which will energize relay $R_3$ whenever the exhaust valve 27 is energized or the contacts $R_{12}$ are closed. Relay $R_3$ has a pair of contacts $R_{31}$ which are in series with solenoid valve 29 that will supply the negative pressure as previously described. Should it be desired to use a hand time control, switch 60 may be opened and hand switch 33, which is in parallel with contact T, may be utilized. Also should it be desired to have a constant flow of air from the device, switch 72 may be closed and hand control switch 34 used instead of the electronic control.

It will be apparent that the inspiratory phase can be terminated either at a given time interval controlled by the unit 32 or when the intrapulmonary pressure reaches a limit determined by the preset pressure-sensing device 26. In either instance, the electronic control 32 shuts the solenoid valve 18 and opens the solenoid exhaust valve 27. The increased intrapulmonary pressure causes the gas to leave the lungs rapidly. This is the expiratory period. Between the time the gases leave the lung and the next inspiratory phase begins constitutes the expiratory pause. The duration of the inspiration, expiration and the expiratory pause can be predetermined or varied by the electronic control 32.

It should be noted that the electronic control unit 32 is also provided with a hand timing device 33 and a hand constant flow regulator 34 to permit the anesthetist to take over the control and do his own timing and flow control.

When the apparatus is serving as an assistor, the pressure-sensing device 26 detects an inspiratory effort on the part of the patient because of a degree of negative pressure produced thereby. This degree of negative pressure is produced by an effort to breathe, the exhaust valve 27 closes and the valve 18 opens allowing the flow of gas to start. The apparatus also serves as a demand mechanism. In a demand mechanism the instantaneous flow requirements may be greater than those necessary for controlled respiration. Thus, when the patient's breathing produces a negative pressure sensed by the device 26, not only is the delivery valve 18 opened, but the auxiliary valve 23 is also opened. The amount of additional gases which may flow through the auxiliary valve 23 may be preset at the manual control valve 22.

The above negative pressure to initiate gas flow is created by the patient. However, it is of increasing physiologic import to provide a degree of negative pressure sometime during the respiratory cycle, either during controlled or assisted respiration. To accomplish this, an air injector system has been incorporated into the exhaust tube 24, so that by opening solenoid valve 29 the gas flow which is metered through valve 30 leaves the system through air injector 31. By so doing a negative pressure is created in exhaust tube 24, since the valve 37 at its terminus shuts down. The negative pressure created is transferred to the patient's lungs since during this interval solenoid valve 27 is open and the sensing device 26 is inactivated. The degree of negative pressure is proportional to the gas flow through valve 30.

As a further aid to the anesthetist, the control box 32 is used with a series of colored lights 54, 55, 56, and 100. The lights 54 and 56 flashing on and off alternately with the inspiratory and expiratory cycles and the light 55 flashing on when the patient is making his own inspiratory breathing effort. Light 100 flashes on when the Venturi assembly is activated.

Figure 6:
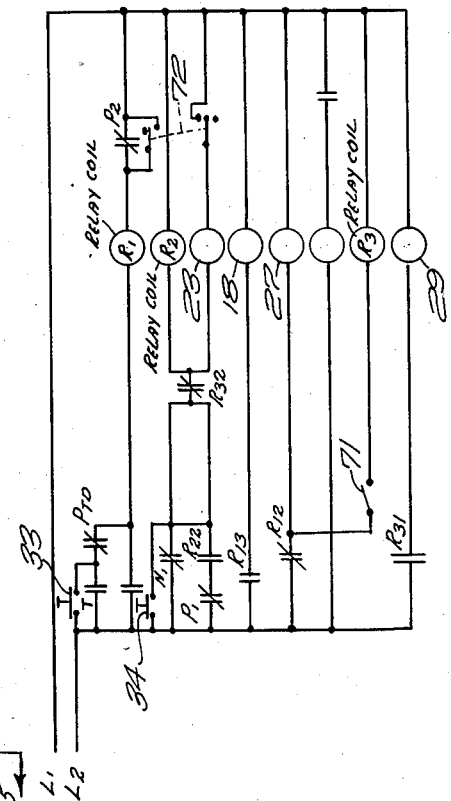
Fig. 6 is a diagram of the relay control assembly.

The above described construction and operation including the control circuits can readily be applied to other types of breathing apparatus, for example, the resuscitating apparatus shown in Fig. 8 or to the respirator or "iron lung" shown in Fig. 9. The apparatus shown in Fig. 8 comprises a face mask 73 and an inlet line 74 and an exhaust line 75. The inlet line 74 is provided with a branch 76 and having a hand control valve 77 and solenoid controlled valve 78. The second branch 79 is provided with a hand control valve 80 and solenoid controlled valve 81. The exhaust line 75 is provided with a pressure-sensing device 82, a solenoid controlled valve 83 and terminates in the "Acushnet" valve 84. The operation of the resuscitator is similar to the operation of the mechanism shown in Fig. 1 in that timed breathing is provided sensitive to the demand and with additional surge valve sensitive to the negative pressures set up by the demand. The device is controlled by the circuit shown in Figs. 6 and 7.

In Fig. 9 the "iron lung" 85 is controlled by an outlet line 86 having a solenoid valve 87. The inlet line 88 is controlled by a solenoid valve 89. Negative pressure is provided by the evacuating pump 90. In addition the chamber 85 is connected to a pressure-sensing device 91. The cycle of negative to positive or negative to atmospheric pressures can thus be electronically controlled in a manner similar to the timed breathing hereinabove described.

Figure 10:
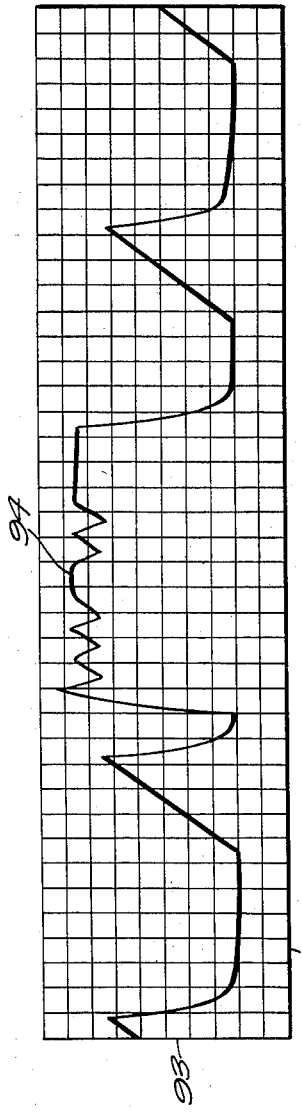
Fig. 10 is a graph of the device operating with the constant flow control.
Figure 11:
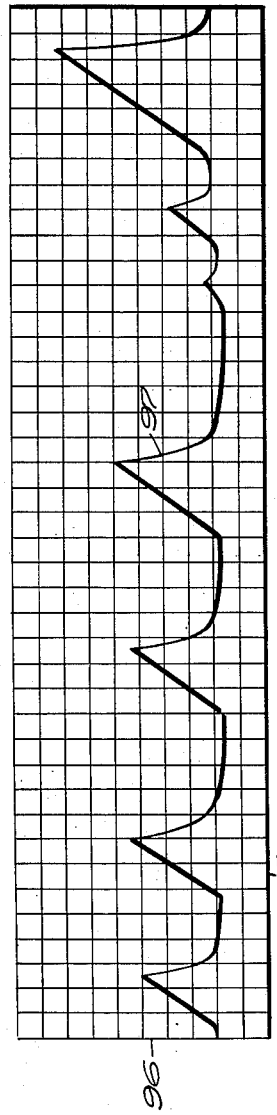
Fig. 11 is a graph of the hand controlled timing device.
Figure 12:
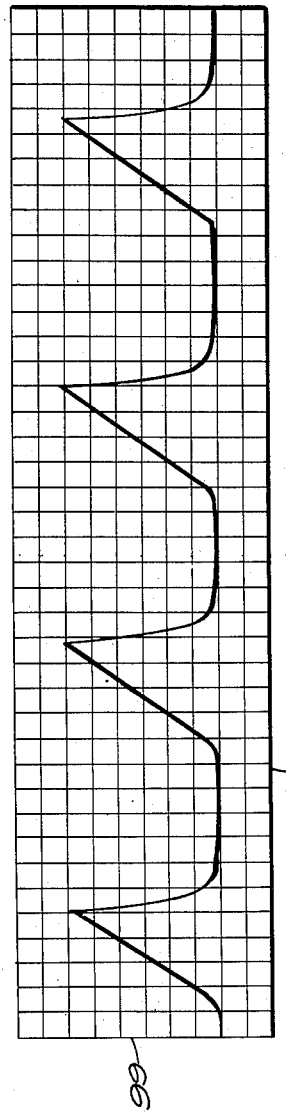
Fig. 12 is a graph of the pressure and time controls by the present apparatus.

Figs. 10, 11, and 12 illustrate the advantages of the present apparatus on graphs made during actual operation. Fig. 10 shows the use of the constant pressure control. Where the horizontal axis 92 represents time and the vertical axis 93 represents pressure, it will be noted that the hand controlled device eliminates the time and provides a reading 94 showing substantially constant pressure over the desired period of time. In Fig. 11 the horizontal axis 95 again represents time, and vertical axis 96 pressure. Where a hand timed control was used the irregularity of the line 97 indicates the difficulty in judging the time and pressures by hand. Fig. 12 graphically illustrates the results obtainable with the device of the present invention. With the horizontal axis 98 representing time and the vertical axis 99 representing pressure, it is obvious that the apparatus provides a rigid regularity in the time and pressure factors to which the device has been set.

The present apparatus provides a full control of flow volume and time of flow in any desired sequence. Thus, an exact volume of air, gas or oxygen may be administered to an individual during the period of inspiration. With these variables under control, it is possible to obtain a certain degree of positive pressure. The expiratory phase is rapid and to ambient pressure if desired.

When the apparatus is breathing for the patient, it is possible to set a desired ratio between inspiration and the expiratory pause. This is accomplished by no other apparatus. It is known that when gases are supplied under pressure to the lungs, the increased intrapulmonary pressure reduces the cardiac output. During the expiratory pause the heart compensates for this period of reduced output. It is thus the essential that a ratio be set up in which the expiratory pause be of sufficient duration to allow the heart to fully compensate for the pressure introduced during inspiration. The present apparatus permits an exact desired ratio to be set and controlled.

The present invention also acts as an assister in combination with the controlled breathing. When the patient is breathing on his own, the apparatus is sensitive to the negative pressure produced and assists such breathing and relinquishes the rigid timed control. The degree of sensitivity may be varied as needed. Should the patient again stop breathing the apparatus will automatically return to its set controlled cycle.

The assister unit of the present invention can serve as an aid to high altitude flying. Since it is sensitive to the demand, the rate and volume of flow of the oxygen can automatically keep pace with the pilot's respiratory rate and needs or when needed can induce forced breathing.

We claim:

1. A respiratory apparatus comprising a source of supply of gases under pressure, a breathing device, an inlet line from said source of supply to a breathing device, an exhaust line from said breathing device, a valve in said inlet line, a valve in said exhaust line, and electronic timing means coupled to said valves for alternately opening and closing said valves to provide an inspiratory and expiratory breathing cycle, said means being operable solely on a time base and adjustable to close said inlet valve and open said exhaust valve after a predetermined time interval, said timing means being activated in response to the failure to reach a predetermined positive pressure.

2. A respiratory apparatus comprising a source of supply of gases under pressure, an inlet line from said source of supply to a breathing device, an exhaust line from said breathing device, a solenoid valve in said inlet line, a solenoid valve in said exhaust line, an electronically controlled timing means coupled to the solenoids of said valves for alternately opening and closing said valves to provide an inspiratory and expiratory breathing cycle, said means being operable solely on a time base and adjustable to close said inlet valve and open said exhaust valve after a predetermined time interval.

3. A respiratory apparatus comprising a source of supply of gases under pressure, a breathing device, an inlet line from said source of supply to a breathing device, an auxiliary inlet line to said breathing device, an exhaust line from breathing device, a valve in said inlet line, a valve in said auxiliary inlet line, a valve in said exhaust line, means for alternately opening and closing said inlet and exhaust valves to provide an inspiratory and expiratory breathing cycle, and pressure-sensitive means for opening said auxiliary inlet valve after said inlet valve has been opened.

4. A respiratory apparatus comprising a source of supply of gases under pressure, a breathing device, an inlet line from said source of supply to a breathing device, an auxiliary inlet line to said breathing device, an exhaust line from said breathing device, a solenoid valve in said inlet line, a solenoid valve in said auxiliary inlet line, a solenoid valve in said exhaust line, means for alternately opening and closing said inlet and exhaust valves to provide an inspiratory and expiratory breathing cycle, and pressure-sensitive means for opening said auxiliary inlet valve after said inlet valve has been opened.

5. A respiratory apparatus comprising a source of supply of gases under pressure, a breathing device, an inlet line from said source of supply to a breathing device, an auxiliary inlet line to said breathing device, an exhaust line from said breathing device, a valve in said inlet line, a valve in said auxiliary inlet line, a valve in said exhaust line, electronically controlled means for alternately opening and closing said inlet and exhaust valves to provide an inspiratory and expiratory breathing cycle, and electronically controlled pressure-sensitive means for opening said auxiliary inlet valve after said inlet valve has been opened.

6. A respiratory apparatus comprising a source of supply of gases under pressure, a breathing device, an inlet line from said source of supply to a breathing device, an auxiliary inlet line to said breathing device, an exhaust line from said breathing device, a solenoid valve in said inlet line, a solenoid valve in said auxiliary inlet line, a solenoid valve in said exhaust line, electronically controlled means for alternately opening and closing said inlet and exhaust valves to provide an insipratory and expiratory breathing cycle, and electronically controlled pressure-sensitive means for opening said auxiliary inlet valve after said inlet valve has been opened.

7. A respiratory apparatus comprising a source of supply of gases under pressure, a breathing device, an inlet line from said source of supply to a breathing device, a by-pass line in parallel with said inlet line, an exhaust line from said breathing device, a solenoid valve in said inlet line, a solenoid valve in said by-pass line, a solenoid valve in said exhaust line, electronically controled means for alternately opening and closing said inlet and exhaust valves to provide an inspiratory and expiratory breathing cycle, said means being adjustable to close said inlet valves and open said exhaust valve after a predetermined time interval, and pressure sensitive means for opening said by-pass inlet line valve after said inlet valve has been opened.

References Cited in the file of this patent

UNITED STATES PATENTS

| | | |
|---|---|---|
| 1,136,517 | Drager | Apr. 20, 1915 |
| 2,055,128 | Herrmann | Sept. 22, 1936 |
| 2,288,436 | Cahan | June 30, 1942 |
| 2,391,877 | Cahan | Jan. 1, 1946 |
| 2,588,192 | Akerman | Mar. 4, 1952 |